United States Patent [19]

Bondeson et al.

[11] 4,310,089

[45] Jan. 12, 1982

[54] CONVEYOR FOR TRANSPORT OF BAGS OF REFUSE

[75] Inventors: Leif ·. Bondeson, Malmo; Stig F. Edner, Vebergod, both of Sweden

[73] Assignee: Platmanufaktur AB, Malmo, Sweden

[21] Appl. No.: 137,373

[22] Filed: Apr. 4, 1980

Related U.S. Application Data

[63] Continuation-in-part of Ser. No. 105,034, Dec. 19, 1979, which is a continuation of Ser. No. 902,038, May 2, 1978, abandoned.

[30] Foreign Application Priority Data

May 10, 1977 [SE] Sweden .............................. 7705409

[51] Int. Cl.³ ............................................. B65G 47/02
[52] U.S. Cl. ..................................... 198/530; 193/33; 198/548; 198/671
[58] Field of Search ............... 198/657, 670, 672, 673, 198/676, 625, 548, 555, 671, 675, 464, 857, 524–525, 540, 565, 530; 406/117; 193/33, 34

[56] References Cited

U.S. PATENT DOCUMENTS 2,438,637 3/1948 Jansen ............................. 198/657 X
2,665,796 11/1949 Anderson .
3,756,372 9/1973 Mertens .............................. 198/524

FOREIGN PATENT DOCUMENTS 961789 5/1978 Canada .
967990 5/1978 Canada .
146493 6/1916 Fed. Rep. of Germany ... 193/33 X
855801 3/1940 France .............................. 198/555
52-47704 4/1977 Japan .................................. 198/671
7011699 5/1977 Sweden .
1142836 5/1977 United Kingdom .
360293 1/1973 U.S.S.R. ............................. 198/670

Primary Examiner—Robert B. Reeves
Assistant Examiner—Douglas D. Watts
Attorney, Agent, or Firm—Hane, Roberts, Spiecens & Cohen

[57] ABSTRACT

A conveyor for transport of bags of refuse comprising a feed tube in which bags of refuse are introduced and transported from one end to the other and a feed screw in the tube for driving the bags of refuse through the tube. The feed screw is constructed as a helix forming successive spaced flanges and the pitch of the helix is such that the space between successive flanges will accommodate a bag of refuse of predetermined maximum overall size. The feed screw is eccentrically journaled in the feed tube and is in tangential contact at the bottom thereof. A charging device for introducing the bags of refuse into the feed tube comprises a vertical tube with an inlet unit which limits the size of the bag of refuse which can be introduced to that which can be accommodated between the flanges of the helix.

14 Claims, 8 Drawing Figures

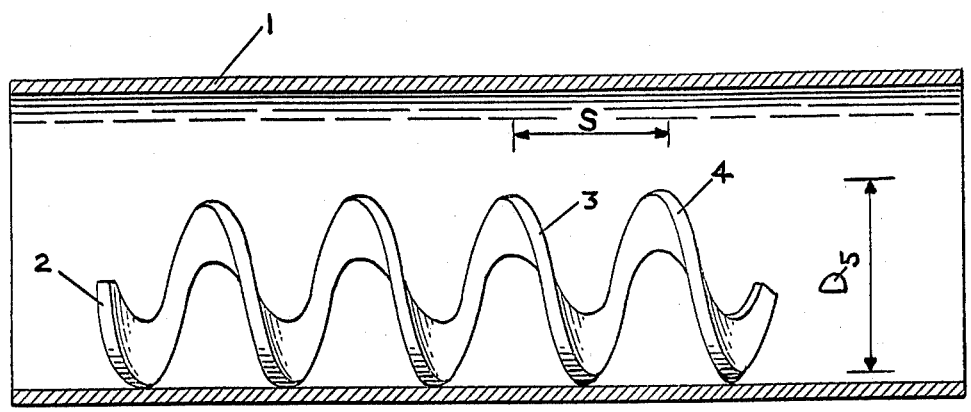
FIG. 1
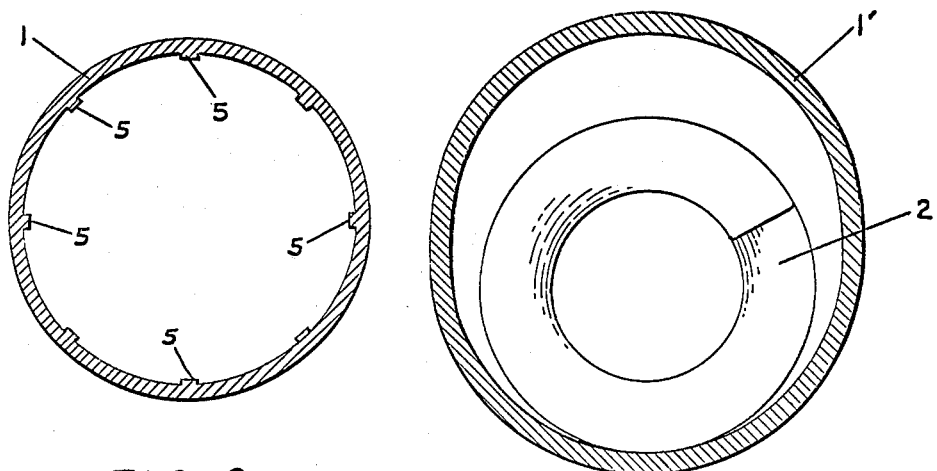
FIG. 2
FIG. 3
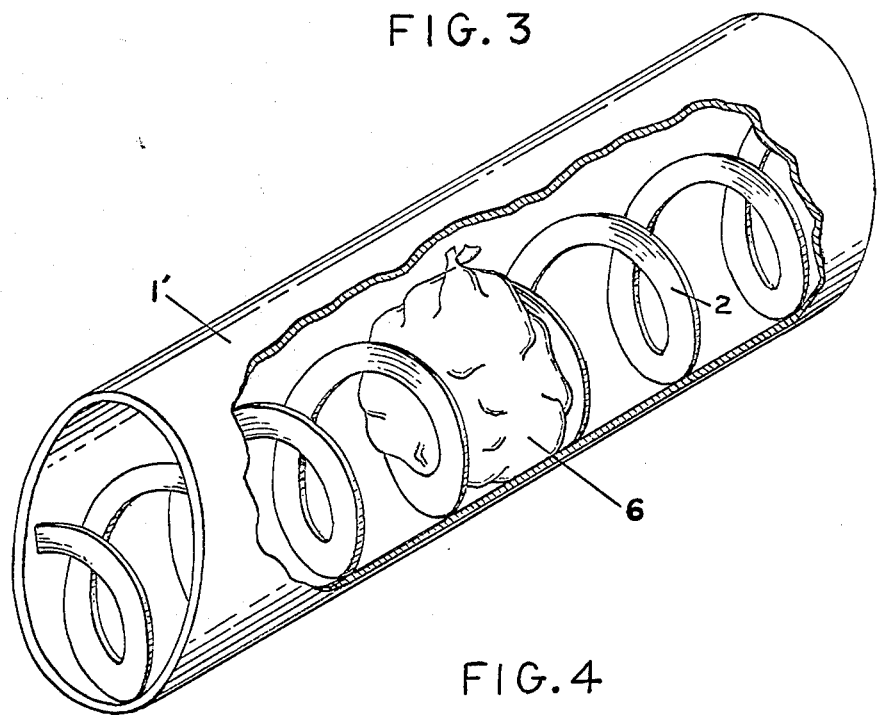
FIG. 4

CONVEYOR FOR TRANSPORT OF BAGS OF REFUSE

CROSS-RELATED APPLICATION

This application is a continuation-in-part of Ser. No. 105,034, filed Dec. 19, 1979 which in turn is a continuation of Ser. No. 902,038 filed May 2, 1978, now abandoned.

FIELD OF THE INVENTION

This invention relates to a screw conveyor consisting of a tube and a feed screw mounted inside the tube.

PRIOR ART

Screw conveyors of similar type are known in connection with the transportation of refuse from refuse chutes in apartment buidlings. Installation of such screw conveyors is generally below ground. At one end the conveyor, as a rule, receives refuse from a refuse chute and at the other end the conveyor discharges the refuse to a receiving station or to another conveyor. Local ordinances stipulate that refuse is to be packaged before disposal in a refuse chute and the packaging material used almost exclusively is a plastic or paper carrier bag of standard format such as are obtainable at all food stores. The openings of filled plastic carrier bags are closed, suitably by tying the ends into a knot. Refuse packaged in this manner is therefore of a standard size. If refuse packaged in this manner is fed into a screw conveyor of the aforementioned type, the packaging will, as a rule, be destroyed and the refuse will therefore be disintegrated during transportation and possibly also give rise to stoppages in the conveyor tube.

SUMMARY OF THE INVENTION

An object of the present invention is to provide a conveyor which moves units of refuse, such as refuse packages having dimensions smaller than the pre-determined overall maximum dimensions in respect of width, height and thickness, as intactly as possible. As a result, the packaged items will arrive at the collecting station, generally, in undamaged condition.

Other objects of the invention are to prevent blockage of the conveyor tube and disintegration of the goods handled by the conveyor.

The above objects are achieved by a conveyor comprising a feed tube equipped with a feed helix that, preferably, is journalled at one end and has a space between two consecutive flanges of such a size that there is room for the refuse unit between the two said flanges. It is also possible to speak of the space between two opposite flange portions or of the pitch of the helix. In addition, the helix, according to the invention, is eccentrically journalled in relation to the surrounding conveyor tube such that the outer circumference of the helix contacts the inner surface of the feed tube. The ratio between the inside diameter of the conveyor tube and the outside diameter of the helix is so chosen that the refuse unit can be moved in either a horizontal or a vertical attitude.

If S refers to the pitch of the helix, D to the maximum inner diameter of the lower part of the tube, d to the diameter of the helix and u to the maximum dimension of the refuse unit, the following relationships ensure a safe conveyance of the refuse unit $$u < 0.9\, S \tag{1}$$

$$S \approx (1 \pm 0.1)\, d \tag{2}$$

$$d \approx (0.75 \pm 0.1)\, D \tag{3}$$

In a suitable application of the invention, the pitch of the helix should be suitably chosen so that it is in the range of 300–400 mm, and preferably in the range of 330–370 mm.

The diameter of the helix, according to the invention, should be between 300 and 360 mm preferably 330–350 mm and the inside diameter of the surrounding feed tube should be between approximately 400 and 500 mm, and preferably between 430 and 470 mm. The ratio of the diameter of the helix and the diameter of the conveyor tube is of the order of 0.65–0.85, preferably 0.70–0.80.

According to the invention, it is suitable to provide the inner surface of the feed tube with a number of longitudinal flanges, fins, flutes, ridges or the like. These flanges may be straight and parallel to the axis of the feed tube. Other configurations of the flanges are also conceivable, such as spirally arranged flanges and obliquely arranged flanges.

A conveyor according to this invention is capable of cooperating with a vertical service duct which may be connected to a chute provided with a number of openings. The openings are provided with a hopper unit of such construction that it only accepts refuse units that do not exceed pre-determined maximum dimensions as regards height, width and thickness, which dimensions are related to the pitch S of the helix as given above.

BRIEF DESCRIPTION OF THE DRAWING

This invention will be described in greater detail with reference to the enclosed drawing, wherein:

FIG. 1 is an elevational view of a conveyor according to the invention consisting of a conveyor tube shown in section and a feed helix or spiral arranged inside the tube;

FIG. 2 is a transverse sectional view of a conveyor tube equipped with a number of flanges or ridges;

FIG. 3 is a transverse sectional view of a conveyor tube having an oval cross-section and a feed helix or spiral therein;

FIG. 4 is a perspective view, particlally broken away, of a conveyor tube with a spiral and showing a refuse unit therein;

DETAILED DESCRIPTION

Figure 5:
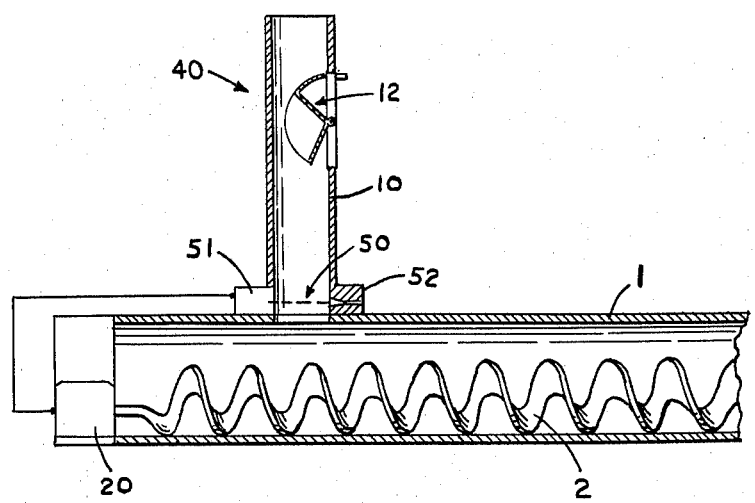
FIG. 5 is a diagrammatic elevational view of the conveyor with the feed means therefor.

In FIGS. 1 and 2 there is shown a conveyor comprising a feed or conveyor tube 1 which may be made of any suitable material, such as plastic, cast iron or the like. Arranged inside the conveyor tube 1 is a helix 2 made from a continuous strip and which consequently has no conventional shaft. The conveyor helix 2 may be of the type described in Swedish Pat. No. 373,096 and is in reality a helix made of alloy steel suitable for this purpose. The helix 2 is connected at one end to a motor 20 (FIG. 5) and at its other end is optionally supported in a suitable bearing. If no bearing is provided at the discharge end of the tube, the same may be open and the helix can advance the refuse bag through the open end. By means of the motor, the helix can be driven in rotation about its longitudinal axis. Helix 2 is so arranged inside the conveyor tube 1 that its outer circumference contacts the inner surface of the surrounding tube. When the helix 2 is driven by the motor and is not supported by a bearing at its free end, the helix can ride up along the inner circumference of the feed tube to a small degree under the action of friction between the screw and the tube.

The pitch S of the helix is equal to the distance between two partial flanges 3 and 4 of the helix 2. The pitch S is related to the largest dimension of a filled refuse bag to be advanced by the conveyor. The inside diameter of the conveyor tube 1 should be at least equal to the height of a filled refuse bag of standard format. Practical tests have shown that the ratio between the outside diameter of helix 2 and the inside diameter of conveyor tube 1 should be between 0.65–0.85, preferably 0.70–0.80.

The conveyor described operates in the following manner. In this connection it is assumed that refuse enclosed in a plastic carrier bag of standard format tied at its open end is dropped down a refuse chute 10 (FIG. 5) in such a manner that the tied bag will end up standing at one end of the conveyor tube. The standing bag is taken up by helix 2 and carried by helix 2 to the other end of the conveyor tube. While being moved by the conveyor the bag will be largely undamaged.

Figure 8:
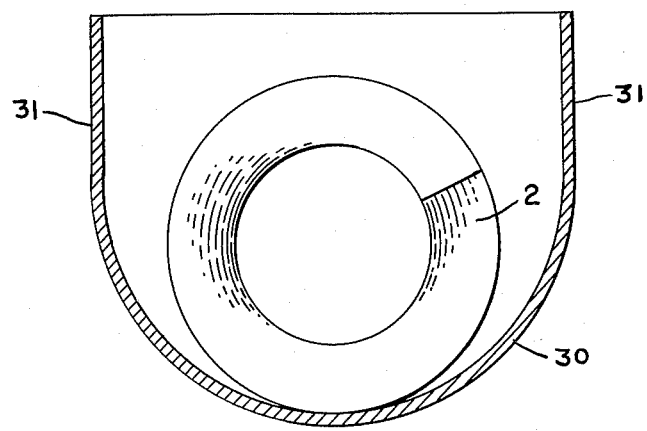
FIG. 8 is similar to FIG. 3 but showing a modified feed tube.

FIG. 3 shows a conveyor tube 1' of oval cross-section. The conveyor tube contains the feed helix or spiral 2. Conveyor tube 1' is of oval cross-section in order to provide better location of refuse unit 6 which is moved by the helix 2 along the conveyor tube. Ovality can also be obtained by means of an upper section of semi-circular configuration or as seen in FIG. 8 by a lower section 30 of semi-circular configuration and two vertical wall sections 31 joining the aforementioned semi-circular section. The lower half of the helix 2 will thereby be in full contact with the surrounding conveyor tube only at the bottom of it. For underground tubes or tubes which pass through walls, the cross-section may be circular.

The conveyor tube 1 in FIG. 1 may be provided on its inner surface with a number of ridges or flanges 5, which are parallel to the axis of the conveyor tube.

The flanges may be arranged symmetrically as shown in FIG. 2 or they may be arranged in any other suitable manner. The flanges may also be obliquely arranged along the conveyor tube or be of helical configuration. The flanges may be manufactured integrally with the conveyor tube. Two functions are fulfilled by the flanges, namely reducing wear in the conveyor tube and also guiding the conveyed refuse, particularly if it consists of rigid objects such as binders, etc.

Conveyor units as in FIGS. 1 and 4 may be combined in numerous ways and in such case also with the aid of various coupling elements.

The conveyor tube is combined with a supply means 40 of tubular cross-section for supplying bags of refuse to the conveyor tube 1. The supply means 40 comprises the vertical chute 10 whose upper end is closed while its lower end is connected to the conveyor tube as in FIG. 5. The chute 10 has an opening 11 (FIG. 7) for packaged refuse.

Figure 6:
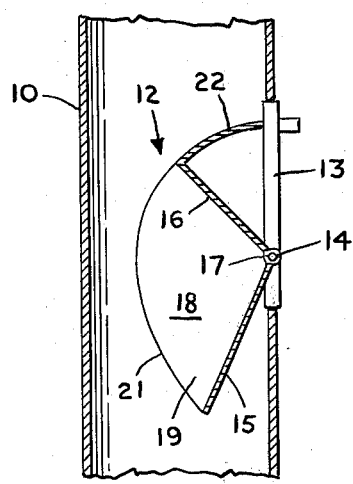
FIG. 6 shows a portion of the feed means in which a hopper is in the closed, discharge position.
Figure 7:
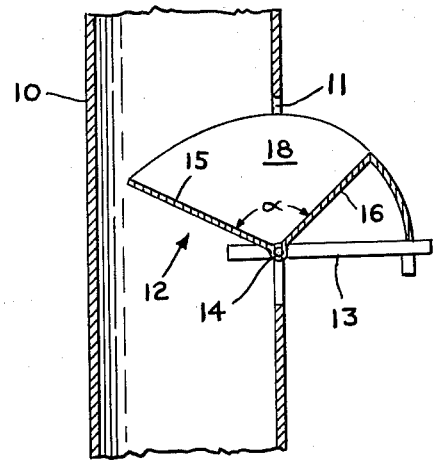
FIG. 7 is similar to FIG. 6 but shows the hopper in the open, supply position.

The opening 11 in the refuse chute 10 is suitably provided with a hopper unit 12 which in open condition as shown in FIG. 7 can accept refuse or a packaged unit that does not exceed certain maximum dimensions as regards height, thickness and width. The hopper unit is either transversely slidable or pivotable about a horizontal or vertical axis. In the illustrated embodiment, the hopper unit comprises a door 13 which is pivotably mounted on a shaft 14. The hopper unit comprises two rectangular plates 15,16 joined to each other along an edge 17 in such a manner that the plates form an angle α relative to each other and define a space 18 therebetween. The plates 15,16 are secured to the door 13 at edge 17 in the vicinity of shaft 14; sidewalls 19 are connected to the edges of plates 15 and 16 to enclose space 18 laterally. The free edge 21 of plate 19 describes a curve such as a circular arc. A curved cover plate 22 closes the space between plate 16 and door 13. In the open position in FIG. 7, the space 18 faces upwardly and is accessible and a bag of refuse can be introduced into the hopper. In the closed position in FIG. 6, the space 18 faces downwardly and the bag of refuse is discharged into the chute 10 where it is dropped into the conveyor. Between the two plates 15 and 16 and the sidewalls 19 an extra support for refuse may be arranged. The hopper unit determines the maximum size of the refuse units that can be supplied to the feed screw.

Since the conveyor is fed at one end with bags of refuse from the vertical chute 10, it is suitable to allow the bag of refuse, just before it reaches the feed screw, to actuate a control device 50 which activates the motor 20 to drive the feed screw and allow the motor to run long enough for the conveyor to be ready to receive the next bag of refuse. The device 50 comprises a photocell detector 51 connected to the motor and a light source 52 aimed at the detector 51 and adapted for being interrupted by a falling bag of refuse.

What is claimed is:

1. A conveyor for transport of bags of refuse comprising a feed tube through which the bags of refuse are transported from one end to the other, supply means for introducing bags of refuse into said feed tube and a feed screw in said tube for drivingly conveying the bags of refuse through said tube, said feed screw comprising a helix forming successive spaced flanges, the pitch of the helix being such that the space between successive flanges will accommodate a bag of refuse of predetermined maximum overall size U, said feed tube having at least a lower portion of rounded shape in cross-section with a major vertical axis, said feed screw being eccentrically supported in said feed tube for rotation therein such that the outer circumference of said feed screw is in tangential contact with the inner circumference of said feed tube at the bottom thereof, means for rotating said feed screw which causes the feed screw to ride up along the inner circumference of said feed tube, said supply means including inlet means having a size related to the size of the feed tube and the size of the feed screw for limiting the size of the bags of refuse so that only bags of refuse less than said predetermined maximum size U will enter said feed tube and pass substantially undamaged therethrough, said supply means comprising a chute extending vertically upwards from said feed tube, said inlet means comprising a hopper supported for pivotable movement with respect to said chute, said hopper having a loading position partially outside said chute for receiving a refuse bag and a discharge position within said chute in which the refuse bag is freely dropped into the chute for passage to said feed tube, said hopper comprising first and second plates connected to one another in the vicinity of the axis of pivotable movement of the hopper, said plates forming an angle therebetween to define a space for a bag of refuse, lateral plates secured to said first and second plates to enclose said space laterally and a separate and independent door secured for pivotal movement about said axis at an angle different from said plates and outside said space, said space facing generally upwards outside said chute in said loading position and generally downwards in said chute in said discharge position to drop the bag of refuse into said chute.

2. A conveyor as claimed in claim 1 wherein said feed tube is oval in cross-section.

3. A conveyor as claimed in claim 1 wherein said feed tube is circular in cross-section.

4. A conveyor as claimed in claim 1 wherein said feed tube is semi-circular in cross-section with two upstanding vertical wall sections.

5. A conveyor as claimed in claim 1 wherein the maximum dimension u of a refuse bag is related to the pitch S of the helix as follows:

$$u < 0.9\, S$$

6. A conveyor as claimed in claim 1 wherein the pitch S of the helix is related to the diameter d of the helix as follows:

$$S \approx (1 \pm 0.1)\, d$$

7. A conveyor as claimed in claim 1 wherein the diameter of the helix is related to the maximum inner diameter D of the lower portion of the feed tube as follows:

$$d \approx (0.75 \pm 0.1)\, D$$

8. A conveyor as claimed in claim 1 wherein the pitch of the helix is between 300 and 400 mm.

9. A conveyor as claimed in claim 1 wherein the diameter of the helix is between 300 and 360 mm.

10. A conveyor as claimed in claim 1 wherein the diameter of the feed tube is between 400 and 500 mm.

11. A conveyor as claimed in claim 1 wherein the ratio of the diameter of the helix and the diameter of the conveyor tube is between 0.65 and 0.85.

12. A conveyor as claimed in claim 1 comprising a plurality of flanges on the inner surface of said tube extending along the length thereof.

13. A conveyor as claimed in claim 2 wherein said flanges on said tube extend axially.

14. A conveyor as claimed in claim 1 wherein said inlet means further comprises a curved cover plate between said door and said first plate to limit introduction of a bag of refuse between said first and second plates.

* * * * *